United States Patent
Pickover et al.

(10) Patent No.: US 9,756,552 B1
(45) Date of Patent: Sep. 5, 2017

(54) REDUCING DISTRACTIONS CAUSED BY USER DEVICES IN GROUP SETTINGS

(71) Applicant: International Business Machines Corporation, Armonk, NY (US)

(72) Inventors: Clifford A. Pickover, Yorktown Heights, NY (US); Robert J. Schloss, Briarcliff Manor, NY (US); Komminist S. Weldemariam, Nairobi (KE); Lin Zhou, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/216,277

(22) Filed: Jul. 21, 2016

(51) Int. Cl.
   *H04W 48/02* (2009.01)
   *H04L 29/08* (2006.01)
   *H04W 24/08* (2009.01)

(52) U.S. Cl.
   CPC ............. *H04W 48/02* (2013.01); *H04L 67/10* (2013.01); *H04W 24/08* (2013.01)

(58) Field of Classification Search
   CPC ........ H04W 48/02; H04W 24/08; H04L 67/10
   See application file for complete search history.

(56) References Cited

U.S. PATENT DOCUMENTS

| 6,944,482 | B2 | 9/2005 | Engstrom et al. | |
| 7,706,843 | B2 | 4/2010 | Kaplan | |
| 8,781,500 | B1 * | 7/2014 | Dekel | H04M 1/72572 455/412.2 |
| 9,135,803 | B1 * | 9/2015 | Fields | B60K 28/066 |

| 2002/0028674 | A1 | 3/2002 | Slettengren et al. |
| 2006/0063563 | A1 | 3/2006 | Kaufman |
| 2007/0182524 | A1 | 8/2007 | Tushinsky et al. |

(Continued)

FOREIGN PATENT DOCUMENTS

| CN | 202679456 U | 1/2013 |
| CN | 203152790 U | 8/2013 |

(Continued)

OTHER PUBLICATIONS

Wikipedia, Indoor Positioning System, May 10, 2016.

(Continued)

*Primary Examiner* — David Bilodeau
(74) *Attorney, Agent, or Firm* — Ryan, Mason & Lewis, LLP

(57) ABSTRACT

Methods, systems, and computer program products for reducing distractions caused by user devices are provided herein. A computer-implemented method includes processing items of activity arising from user devices within a group setting, wherein each device is associated with a participating user of the group setting and coupled to a distinct status indicator that designates the corresponding user device as engaging in distracting activity or not engaging in distracting activity. The method also includes comparing each of the items of activity to a collection of user device usage policies for the group setting that identifies context-dependent items of activity arising that serve as a distraction within the group setting. Also, the method includes generating a signal to modify the status indicator of at least one of the user devices corresponding to an item of activity deemed as serving as a distraction, and transmitting the signal to the given user devices.

20 Claims, 5 Drawing Sheets

(56) References Cited

U.S. PATENT DOCUMENTS

| | | | |
|---|---|---|---|
| 2011/0151851 A1 | 6/2011 | Foley et al. | |
| 2012/0231434 A1 | 9/2012 | Standage | |
| 2014/0045449 A1 | 2/2014 | Cook et al. | |
| 2014/0162595 A1* | 6/2014 | Raleigh | H04L 67/22 455/405 |
| 2014/0309864 A1* | 10/2014 | Ricci | H04W 48/04 701/36 |
| 2015/0008868 A1 | 1/2015 | Whitehead | |
| 2015/0141043 A1* | 5/2015 | Abramson | G01C 21/34 455/456.1 |
| 2016/0021238 A1 | 1/2016 | Abramson et al. | |
| 2016/0205238 A1* | 7/2016 | Abramson | G01C 21/3484 455/456.4 |

FOREIGN PATENT DOCUMENTS

| | | |
|---|---|---|
| CN | 103295449 A | 9/2013 |
| EP | 2478505 A2 | 7/2012 |
| WO | 2012162395 A1 | 11/2012 |

OTHER PUBLICATIONS

Selleck, E. Iphone Hacks, The Ty-Lite Case will Light up your iPhone 6s Like a Dressing Room Mirror for the Perfect Selfie, Jan. 4, 2016, http://www.iphonehacks.com/2016/01/ty-lite-iphone-6s-selfie-case.html.

Graham, E., NEA, Using Smartphones in the Classroom, 2015. http://www.nea.org/tools/56274.htm.

Bahl et al., RADAR: An In-Building RF-based User Location and Tracking System, 2000.

* cited by examiner

REDUCING DISTRACTIONS CAUSED BY USER DEVICES IN GROUP SETTINGS

FIELD

The present application generally relates to information technology, and, more particularly, to mobile device technology.

BACKGROUND

Teachers and students face challenges in classroom settings that can include distractions caused by students using mobile devices during a class session. For instance, a device being used can potentially compete for the attention of the user operating the device as well as other students or participants in the class or group setting. However, completely banning such devices can preclude the use of education-friendly applications and other related uses that might further the classroom experience for both students and teachers.

SUMMARY

In one embodiment of the present invention, techniques for reducing distractions caused by user devices in group settings are provided. An exemplary computer-implemented method can include processing one or more items of activity arising from each of one or more user devices within a group setting, wherein each of the user devices is (i) associated with a participating user of the group setting and (ii) coupled to a distinct status indicator that designates the corresponding user device as (a) engaging in distracting activity or (b) not engaging in distracting activity. Such a method can also include comparing each of the items of activity to a collection of user device usage policies for the group setting, wherein the collection of user device usage policies identifies context-dependent items of activity arising from a user device that serve as a distraction to participating users within the group setting. Further, such a method can additionally include generating a signal to modify the status indicator, to a designation of engaging in distracting activity, of at least one of the user devices corresponding to an item of activity deemed as serving as a distraction based on said comparing, and transmitting the signal to the at least one user device corresponding to an item of activity deemed as serving as a distraction to the participating users.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
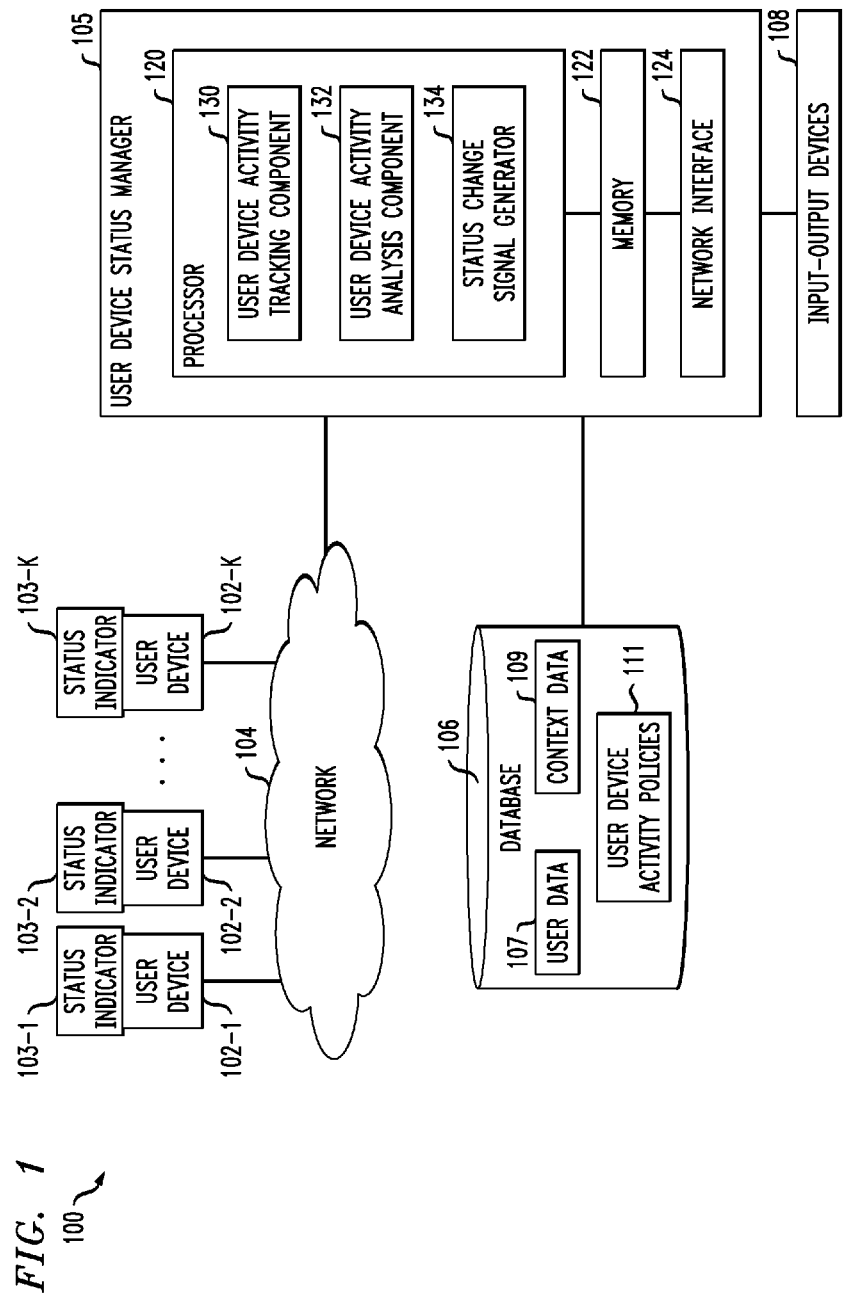
FIG. 1 is a block diagram of a computer network configured for managing the visual status indicator of user devices, in accordance with an example embodiment of the invention.

As described herein, an embodiment of the present invention includes reducing distractions caused by user devices in group settings (such as, for example, classrooms) by altering participant/student behavior through feedback. At least one embodiment of the invention includes equipping user devices (such as, for example, mobile devices, smartphones, tablets, laptops, cameras, smart watches, and computers in clothing) used by students in a classroom, and/or patrons in a library, group transportation vehicle (such as an airplane) or other public setting, with a visual status indicator. As further detailed herein, such a visual status indicator can include, for example, a case encompassing the device, wherein such a case is capable of lighting up and/or changing colors of illumination.

In accordance with at least one embodiment of the invention, devices can be manufactured with a visual indicator, and/or devices can use a pre-existing component (such as a flash used for taking photos in low-light conditions, for example) as an indicator. Alternatively, one or more embodiments of the invention can include supplementing devices with additional components or cases for the devices which can include a visual indicator. As further detailed herein, one or more embodiments of the invention can also include implementing and/or using vibration indicators and/or audio indicators to replace and/or supplement a visual indicator.

At least one embodiment of the invention additionally includes tracking and analyzing activity of user devices to identify inappropriate use of device within pre-determined context for the given setting. By way merely of example, in a classroom setting, user device activity such as tweeting or chatting via a chat application (app) or a Bluetooth® app during a class session or designated study time can be deemed inappropriate. In one or more embodiments of the invention, the detection of inappropriate use can take place on the device, without the need for reporting back to any cloud service that such use has occurred.

Based on such tracking and analysis of user device activity, at least one embodiment of the invention can include changing the visual indicator status of devices engaging in inappropriate activity (or those devices that are no longer engaging in inappropriate activity) by directing a modification to the visual status indicator of the given devices. Such a modification might include, for example, activating one or more lights embodied within or by the visual status indicator (such as, for example, on the edges of a case encompassing the device), modifying the illumination color (and/or illumination intensity) of the visual status indicator, and/or blinking or flashing one or more lights embodied within or by the visual status indicator.

Further, one or more embodiments of the invention can also include affecting the usability status of certain apps or programs installed on the user device(s) based on the tracking and analysis of device activity. For example, some functions and/or apps of a user device may be blocked from use under certain pre-determined parameters, or some functions and/or apps of a user device may be modified to behave in a distinct mode under certain pre-determined parameters (for example, saving the text of a tweet (or other social media/network message or short message service (SMS) text) and transmitting the tweet only after a class session ends).

Additionally, at least one embodiment of the invention can include measuring and/or providing an indication of the engagement level of a user (a student, for example) based on the level of context-inappropriate activity engaged in by the user via the user's device. In one or more embodiments of the invention, a variety of systems can be implemented to convey an engagement indication. Further, such engagement can be categorized and/or classified under multiple categories or classifications, such as: (i) completely engaged, which indicates no distracted activity whatsoever; (ii) largely engaged, which indicates that the student been carrying out inappropriate use for less than a given percentage (for example, 3%) of class time (up to that point); (iii) somewhat engaged, which indicates that the student been carrying out inappropriate use for a first predetermined range (for example, from 3% to 15%) of class time (up to that point); (iv) marginally engaged, which indicates that the student been carrying out inappropriate use for a second predetermined range (for example, 16% to 30%) of class time (up to that point); and (v) not engaged, which indicates that the student been carrying out inappropriate use for more than a given percentage (for example, 31% or more) of the total class time (up to that point).

Also, one or more embodiments of the invention can be implemented to provide user device safety protocols, for example, in a setting wherein user device activity (and/or distraction caused thereby) may raise safety concerns.

FIG. 1 is a block diagram of a computer network configured for managing the visual status indicator of user devices, in accordance with an example embodiment of the invention. By way of illustration, FIG. 1 depicts a computer network 100 configured in accordance with an illustrative embodiment of the invention. The computer network 100 comprises a plurality of user devices 102-1, 102-2, . . . 102-K, collectively referred to herein as user devices 102. Each user device is equipped with and/or has coupled thereto a status indicator 103 (identified in FIG. 1 as status indicator 103-1, 103-2, . . . 103-K, collectively referred to herein as status indicators 103). Additionally, the user devices 102 are coupled to a network 104, wherein the network 104, in one or more embodiments of the invention, is assumed to represent a sub-network or other related portion of the larger computer network 100.

Referring to status indicators 103, such a component can include, in an example embodiment of the invention, an illumination-capable case that surrounds the perimeter of a user device 103 (such as a smartphone), and can include a light-emitting diode (LED), a printed circuit board (PCB), and a battery assembly. Such a status indicator 103 can also include one or more programmable microprocessors that control one or more LED lights, one or more liquid crystal display (LCD) screens, one or more LED screens, one or more motion sensing chips, one or more audio detection sensor microphones, and/or one or more electronic microprocessor switches that activates electronic components powered by a battery that provides power to the illumination-capable case. In one or more additional example embodiments of the invention, a separate battery can be employed, or the user device battery can be employed.

Also, in another example embodiment of the invention, a status indicator 103 can include a lighting user device housing (with a light box region) that is positioned and/or disposed on a portion (such as the top, for example) of the housing of the user device 102. Such a status indicator 103 can additionally include a circuit board disposed inside the light box, a laser light source disposed on a portion of the light box, and a battery sheet disposed on a separate portion of the light box. Alternatively, a separate battery and/or the user device battery can be employed. Also, in one or more embodiments of the invention, the status indicator can include an audio indicator or a tactile indicator.

Also, elements 100 and 104 are both referred to herein as examples of "networks," but the latter is assumed to be a component of the former in the context of the FIG. 1 embodiment. Additionally, also coupled to the network 104 is a user device status manager 105. By way merely of example and/or illustration, the user device status manager 105 can be used by a teacher (through a device in a classroom, for example) to manage features of students' user devices 102 through a wireless network (such as 104) and server solution, or peer-to-peer solution.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective mobile devices associated with a classroom, school, organization, enterprise, or other public group setting. Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks each comprising processing devices configured to communicate using internet protocol (IP) or other related communication protocols.

The user device status manager 105 has an associated database 106 configured to store data characterizing multiple network sessions for each of a plurality of distinct user identifiers. The database 106 more particularly stores user data 107, context data 109, and user device activity policies 111. The user device activity policies can include provisions and/or controls pertaining to permissible/impermissible content pools and/or device applications (apps), as well as parameters such as, for example, temporal limits on device usage within one or more contexts or settings.

The database 106 in the present embodiment is implemented using one or more storage systems associated with the user device status manager 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the user device status manager 105 are input-output devices 108, which illustratively comprise keyboards, displays or other types of input-output devices in any combination. Such input-output devices are used to support one or more user interfaces to the user device status manager 105, as well as to support communication between the user device status manager 105 and other related systems and devices not explicitly shown.

In at least one embodiment of the invention, signals generated by the user device status manager 105 (specifically, via the status change signal generator 134) are provided over the network 104 to one or more of the user devices 102. Such devices, as noted herein, are configured for communication over network 104 with the user device status manager 105.

The user device status manager 105 in the FIG. 1 embodiment is assumed to be implemented using at least one processing device. Each such processing device generally comprises at least one processor and an associated memory, and implements one or more functional modules for controlling certain features of the user device status manager 105.

More particularly, the user device status manager 105 in this embodiment comprises a processor 120 coupled to a memory 122 and a network interface 124. The network interface 124 allows the user device status manager 105 to communicate over the network 104 with the user devices 102, and illustratively comprises one or more conventional transceivers.

The processor 120 further comprises a user device activity tracking component 130, a user device activity analysis component 132, and a status change signal generator 134. As further detailed herein, components 130 and 132 can detect (in real-time), track and analyze context-inappropriate activity on a user device 102, and based on such tracking and analyzing, the status change signal generator 134 can generate a signal that (upon transmission to the given user device) can modify and/or update the status indicator 103 (light up the indicator, change a color of the indicator, etc.) of a particular user device 102.

The user device activity analysis component 132 can consider and/or analyze input information and context as provided by sources such as an electronic calendar, a location sensor, crowd-source information (such as, for example, votes by other students who may find that a particular student is generating a distraction via usage of his or her user device), and historical data (pertaining to a particular user, for example). Additionally, components 130 and 132 can also incorporate a focus on particular device uses as chatting, tending to phone calls, tweeting, sending certain kinds of messages or using certain kinds of apps, and/or accessing certain content pools. Further, components 130 and 132 can additionally incorporate a temporal focus (such as, for example, the use of the device during an exam or a quiz) and/or a location-based focus (such as, the use of certain device functions in predefined locations (such as inside a school, as restricted by school policy)).

Also, in least one embodiment of the invention, the user device activity analysis component 132 can leverage contextual information (for example, by detecting emergency situations from text message content, tweeting content, incoming phone call content, voice mailbox item metadata, social media and/or social network alerts, etc.) to make intelligent decisions with respect to potentially changing the status indicator 103 of a user device 102. Leveraging the above-noted contextual information can include, for example, searching a portion of displayable characters of incoming messages on the user device, wherein such characters can include portions of a text message, the title of a web page, etc.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the user device activity tracking component 130, the user device activity analysis component 132, and the status change signal generator 134 may be implemented at least in part in the form of software that is stored in memory 122 and executed by processor 120.

It is to be understood that the particular set of elements shown in FIG. 1 for automatically detecting session-based access anomalies involving user devices 102 of computer network 100 and for automatically implementing remedial measures based on the detected session-based access anomalies is presented by way of illustrative example only, and in other embodiments additional or alternative elements may be used. Thus, another embodiment may include additional or alternative systems, devices and other network entities, as well as different arrangements of modules and other components.

By way of example, in other embodiments, the user device status manager 105 can be eliminated and associated elements such as user device activity tracking component 130, user device activity analysis component 132, and status change signal generator 134 can be implemented elsewhere in the computer network 100.

Figure 2:
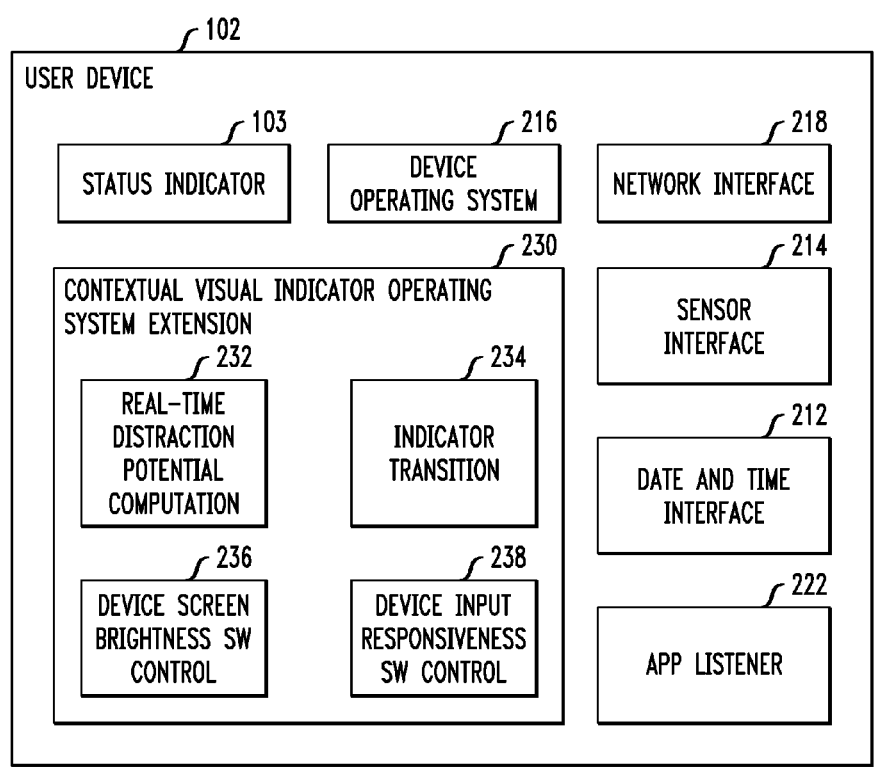
FIG. 2 is a block diagram of a user device, in accordance with an example embodiment of the invention.

FIG. 2 is a block diagram of a user device, in accordance with an example embodiment of the invention. By way of illustration, FIG. 2 depicts a user device 102 (such as depicted in FIG. 1, for example), which includes an operating system 216, a network interface 218, a sensor interface 214 (which can include an instrumentation module that can listen and/or collect event data from the device sensors (indoor positioning beacon signal receivers, global positioning system (GPS) sensors, sound/voice sensors, touch sensors, cameras, etc.)), a date and time interface 212, and an application (app) listener 222. The app listener 222 can include software that detects what applications are currently communicating with the user (via part or all of the screen and/or audio), and for those applications which are portals to an open-ended set of content. Additionally, the app listener 222 can also detect the resource(s) (remote user, channel name, page name, uniform resource identifier (URI), etc.) being shown.

Further, the user device 102 also includes a status indicator 103 (such as depicted in FIG. 1, for example), as well as a contextual visual/status indicator operating system extension 230. With respect to the status/contextual visual indicator 103, in one or more embodiments of the invention (such as, for example, in connection with small form factors such as watches or jewelry), the visual indicator 103 can be supplemented with audio capability, vibration capability, as well as signals primarily observable by the wearer (squeezing, tapping, etc.).

Referring again to FIG. 2, the extension 230 includes a real-time distraction potential computation component 232, an indicator transition component 234, a device screen brightness software (SW) control component 236, and a device input responsiveness software control component 238.

The real-time distraction potential computation component 232 calculates the level of distraction of the current user interaction with the device or app to determine if a (predetermined) threshold has been exceeded. Additional details as to the actions carried out by component 232 are further described in connection with steps 410 through 414 of FIG. 4. The indicator transition component 234 activates and/or commences the status indicator 103 if the above-noted threshold has been exceeded. Such activation can include for example, flashing a light slowly at first, then flashing or getting brighter gradually over subsequent moments, until reaching maximum visibility. The indicator transition component 234 is also responsible for turning off the status indicator 103 when component 232 determines that all of the distracting activity has stopped. In order to not have very short term oscillation between visual indicator on or off, component 232 takes into account what has been happening over a short period of time (such as, for example, ten seconds), rather than provide an instantaneous calculation.

The device screen brightness SW control component 236 manipulates any screen in the 102 device. By way of example, while the status indicator 103 is on/activated, the screen may become greyed out, or less visible, or slower to repaint (or perhaps the audio volume is reduced when in distraction mode). The device input responsiveness software control component 238 manipulates the responsiveness of the touchscreen, keyboard, pointer, and/or spoken audio command processing of the device 102.

Figure 3:
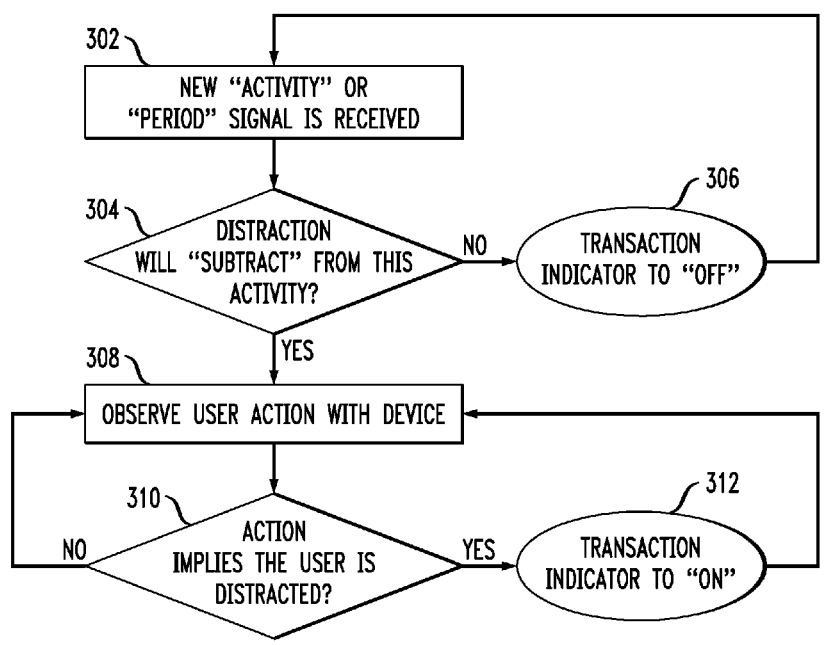
FIG. 3 is a flow diagram illustrating techniques, according to an embodiment of the invention.

FIG. 3 is a flow diagram illustrating techniques, according to an embodiment of the invention. In step 302, a new activity or period signal is received. In step 304, a determination is made as to whether a user device-related distraction will subtract from this activity or period. If no (that is, a user device-related distraction will not subtract from the activity or period), then step 306 includes turning a transaction indicator to an "off" setting (on the user's (student's) device). If yes (that is, a user device-related distraction will subtract from the activity or period), then step 308 includes observing user action on one or more user devices within a given context and/or setting. In step 310, a determination is made as to whether a particular action on a user device implies that a user is distracted. If no (that is, the action does not imply distraction), then observation continues via step 308. If yes (that is, the action does imply distraction), then step 312 includes turning the transaction indicator to an "on" setting.

Figure 4:
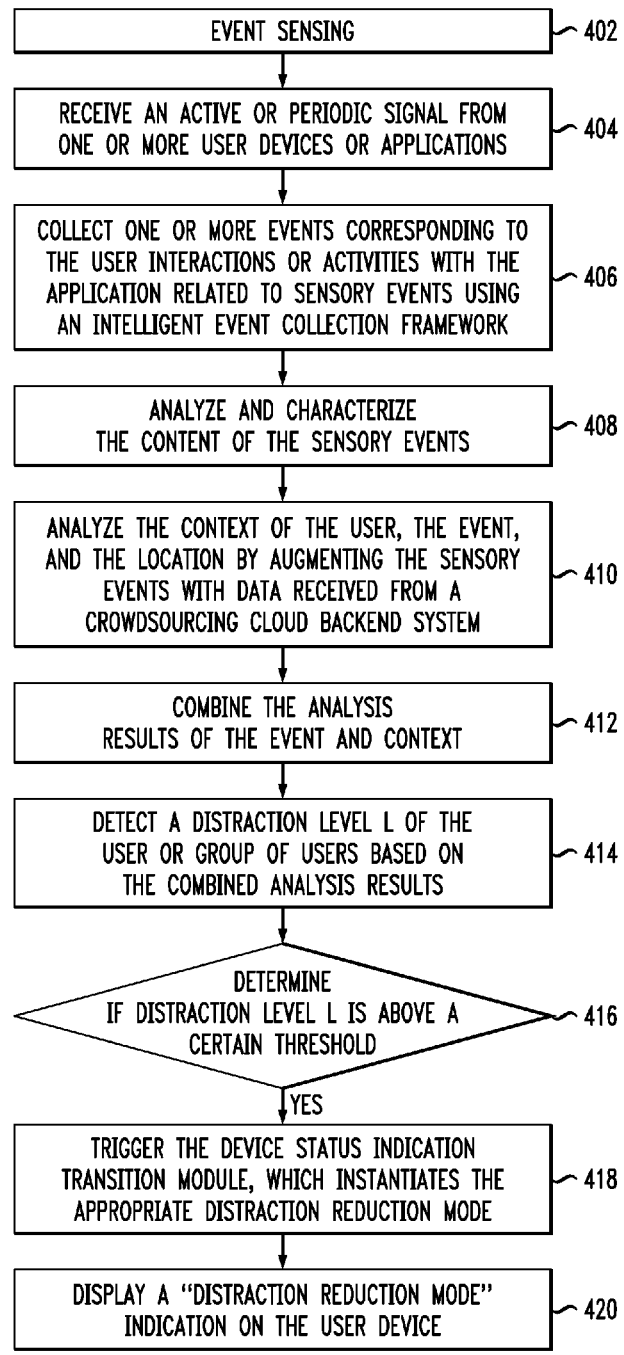
FIG. 4 is a flow diagram illustrating techniques, according to an embodiment of the invention.

FIG. 4 is a flow diagram illustrating techniques, according to an embodiment of the invention. Step 402 includes performing event sensing, for example, via, instrumentation of the user devices and/or sensors. Step 404 includes receiving an active and/or periodic signal from one or more user devices or applications thereon. Step 406 includes collecting one or more events corresponding to user interactions or activities related to the received signal (such as, for example, a notification from a chat program and/or application, a social media application, an email application, etc.) related to one or more sensory events (captured, for example, via an indoor positioning beacon signal receiver, a GPS sensor and/or a camera) using an intelligent event collection framework. An intelligent event collection framework can include classes of device events that can be utilized by one or more embodiments of the invention to see and/or observe only relevant events. For example, the event of "battery remaining is now down to 10%" may not be relevant, and as such, one or more embodiments of the invention can implement an intelligent collection framework to ignore and/or preclude observation of such an event. Additionally, an intelligent event collection framework can also group a sequence of connected sensory atomic events into one significant semantic event. For example, typing the letters of a uniform resource locator (URL) into the browser address bar preferably should not result in an event for each letter. However, utilizing an intelligent event collection, at least one embodiment of the invention can include aggregating an event of entering the entire URL string into the browser address bar.

Step 408 includes analyzing and characterizing the content of the one or more sensory events using machine learning, a deep neural network, etc. By way merely of example, AlchemyAPI™ representational state transfer (REST) application programming interface (API) can be used to understand the content of given text data, image data and/or audio data by encapsulating deep learning or machine learning models. Step 410 includes analyzing the context of the user (such as, for example, the level of user stress, irritation, confusion, annoyance, etc.), the event (for example, an emergency event), location (such as in a classroom, in church, in a meeting, etc.) by augmenting the one or more sensory events with data received from a crowdsourcing cloud backend system. Such a backend system, which can be stored in a cloud infrastructure, can include a crowdsourcing database that maintains distraction hot-spots, other real-time sensory data (for example, acoustic sensor data, noise sensor data, etc.), and information or data from neighborhood devices (for example, nearby mobile phones, cameras, etc.). Step 412 includes combining the analysis results of the event and context analyses using, for example, similarity, clustering, pattern detection, and/or learning algorithms. Step 414 includes detecting a distraction level L of the relevant user or group of users based on combined analysis results.

In step 416, a determination is made as to whether the detected distraction level L is above a certain threshold. The threshold value to be tested can be variable. For example, the threshold value can be contextual; that is, it can be a function of location, time-of-day, other applications being used on the device etc. If yes (that is, the detected distraction level L is above the threshold), then step 418 includes triggering the device status indicator transition module, which instantiates the appropriate distraction reduction mode (such as, for example, a color activation and/or change, a vibration instantiation, a voice instantiation, etc.). Further, step 420 includes displaying a "distraction reduction mode" indication on the user device.

Figure 5:
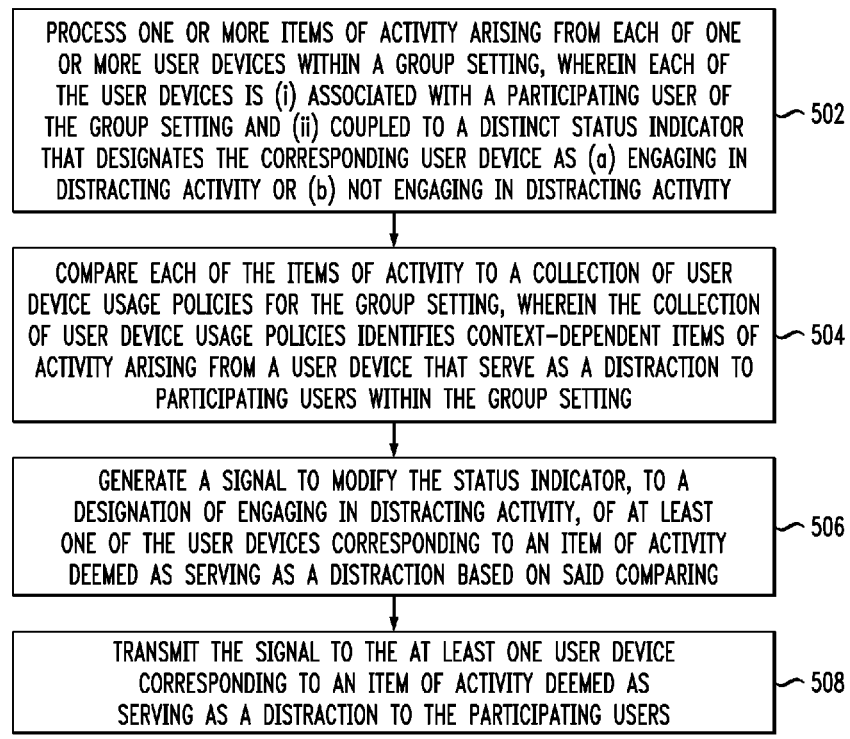
FIG. 5 is a flow diagram illustrating techniques, according to an embodiment of the invention.

FIG. 5 is a flow diagram illustrating techniques, according to an embodiment of the present invention. Step 502 includes processing one or more items of activity arising from each of one or more user devices within a group setting, wherein each of the user devices is (i) associated with a participating user of the group setting and (ii) coupled (for example, physically coupled) to a distinct status indicator that designates the corresponding user device as (a) engaging in distracting activity or (b) not engaging in distracting activity. The status indicator can include a visual status indicator, wherein the visual status indicator can include a set of one or more lights. In such an embodiment, a signal can illuminate the one or more lights and/or modify the color of the one or more lights. Additionally, the status indicator can include an audio status indicator and/or a tactile status indicator.

Step 504 includes comparing each of the items of activity to a collection of user device usage policies for the group setting, wherein the collection of user device usage policies identifies context-dependent items of activity arising from a user device that serve as a distraction to participating users within the group setting. The context-dependent items of activity arising from a user device that serve as a distraction can include context-dependent text messaging, context-dependent telephone call activity, context-dependent activity within a chatting application, context-dependent activity within a social media application, context-dependent activity within a social network application, content-dependent activity, temporal-dependent activity, and/or location-dependent activity.

Step 506 includes generating a signal to modify the status indicator, to a designation of engaging in distracting activity, of at least one of the user devices corresponding to an item of activity deemed as serving as a distraction based on said comparing. Generating a signal can be further based on crowd-sourced information derived from one or more of the participating users within the group setting, and/or on historical information pertaining to one or more of the participating users within the group setting. Also, in at least one embodiment of the invention, the signal can further temporarily block usage of one or more applications on the at least one user device corresponding to an item of activity deemed as serving as a distraction.

Additionally, generating can be further based on input from a calendar application, wherein the input from a calendar application comprises at least one of (i) the scheduled start-time of the group setting, (ii) the scheduled end-time of the group setting, (iii) a classification of the group setting, and (iv) the identity of a leader of the group setting.

Step 508 includes transmitting the signal to the at least one user device corresponding to an item of activity deemed as serving as a distraction to the participating users.

At least one embodiment of the invention (such as the techniques depicted in FIG. 5, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user (such as a teacher or an administrator, for example) enrolls, the service receives user device activity information sent from one or more data sources (user devices of students in a classroom setting, for example) to the transmission server. The server can process the information, for example, based upon provided user device activity policies stored in memory on the server. Subsequently, an alert is generated containing flagged user device activity information. The alert can be formatted into data blocks, for example, based upon any provided alert format preference information. Subsequently, the alert and/or formatted data blocks are transmitted over a data channel to the user's wireless device (for example, the teacher's laptop or smartphone). After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
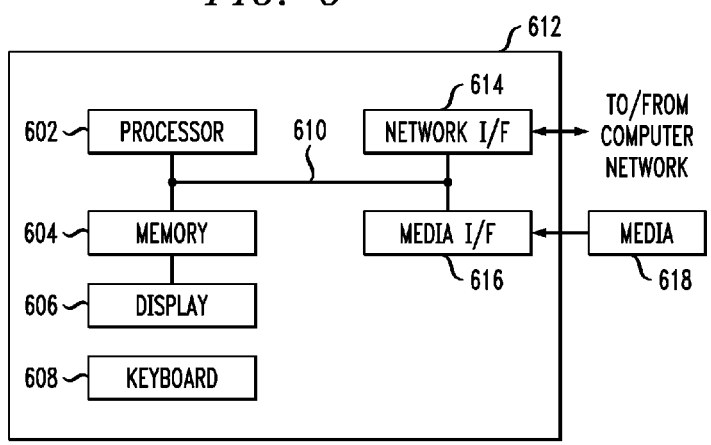
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any other type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dynamically changing the status of a visual indicator of a particular mobile device based on tracking and analyzing the use of the mobile device in a classroom and/or specified public setting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    processing one or more items of activity arising from each of one or more user devices within a group setting, wherein each of the user devices is (i) associated with a participating user of the group setting and (ii) coupled to a distinct status indicator that designates the corresponding user device as (a) engaging in distracting activity or (b) not engaging in distracting activity;
    comparing each of the items of activity to a collection of user device usage policies for the group setting, wherein the collection of user device usage policies identifies context-dependent items of activity arising from a user device that serve as a distraction to participating users within the group setting;
    generating a signal to modify the status indicator, to a designation of engaging in distracting activity, of at least one of the user devices corresponding to an item of activity deemed as serving as a distraction based on said comparing; and
    transmitting the signal to the at least one user device corresponding to an item of activity deemed as serving as a distraction to the participating users;
    wherein the steps are carried out by at least one computing device.

2. The computer-implemented method of claim 1, wherein the status indicator comprises a visual status indicator.

3. The computer-implemented method of claim 2, wherein the visual status indicator comprises a set of one or more lights.

4. The computer-implemented method of claim 3, wherein the signal illuminates the one or more lights.

5. The computer-implemented method of claim 3, wherein the signal modifies the color of the one or more lights.

6. The computer-implemented method of claim 1, wherein the status indicator comprises an audio status indicator.

7. The computer-implemented method of claim 1, wherein the status indicator comprises a tactile status indicator.

8. The computer-implemented method of claim 1, wherein the context-dependent items of activity arising from a user device that serve as a distraction comprise context-dependent text messaging.

9. The computer-implemented method of claim 1, wherein the context-dependent items of activity arising from a user device that serve as a distraction comprise context-dependent telephone call activity.

10. The computer-implemented method of claim 1, wherein the context-dependent items of activity arising from a user device that serve as a distraction comprise context-dependent activity within a chatting application.

11. The computer-implemented method of claim 1, wherein the context-dependent items of activity arising from a user device that serve as a distraction comprise context-dependent activity within a social media application.

12. The computer-implemented method of claim 1, wherein the context-dependent items of activity arising from a user device that serve as a distraction comprise context-dependent activity within a social network application.

13. The computer-implemented method of claim 1, wherein the context-dependent items of activity arising from a user device that serve as a distraction comprise at least one of content-dependent activity, temporal-dependent activity, and location-dependent activity.

14. The computer-implemented method of claim 1, wherein said generating is further based on input from a calendar application.

15. The computer-implemented method of claim 14, wherein the input from a calendar application comprises at least one of (i) the scheduled start-time of the group setting, (ii) the scheduled end-time of the group setting, (iii) a classification of the group setting, and (iv) the identity of a leader of the group setting.

16. The computer-implemented method of claim 1, wherein said generating is further based on crowd-sourced information derived from one or more of the participating users within the group setting.

17. The computer-implemented method of claim 1, wherein said generating is further based on historical information pertaining to one or more of the participating users within the group setting.

18. The computer-implemented method of claim 1, wherein the signal further temporarily blocks usage of one or more applications on the at least one user device corresponding to an item of activity deemed as serving as a distraction.

19. A computer program product comprising a computer readable storage medium having program instructions embodied therewith, the program instructions executable by a device to cause the device to:
  process one or more items of activity arising from each of one or more user devices within a group setting, wherein each of the user devices is (i) associated with a participating user of the group setting and (ii) coupled to a distinct status indicator that designates the corresponding user device as (a) engaging in distracting activity or (b) not engaging in distracting activity;
  compare each of the items of activity to a collection of user device usage policies for the group setting, wherein the collection of user device usage policies identifies context-dependent items of activity arising from a user device that serve as a distraction to participating users within the group setting;
  generate a signal to modify the status indicator, to a designation of engaging in distracting activity, of at least one of the user devices corresponding to an item of activity deemed as serving as a distraction based on said comparing; and
  transmit the signal to the at least one user device corresponding to an item of activity deemed as serving as a distraction to the participating users.

20. A system comprising:
a memory; and
at least one processor coupled to the memory and configured for:
  processing one or more items of activity arising from each of one or more user devices within a group setting, wherein each of the user devices is (i) associated with a participating user of the group setting and (ii) coupled to a distinct status indicator that designates the corresponding user device as (a) engaging in distracting activity or (b) not engaging in distracting activity;
  comparing each of the items of activity to a collection of user device usage policies for the group setting, wherein the collection of user device usage policies identifies context-dependent items of activity arising from a user device that serve as a distraction to participating users within the group setting;
  generating a signal to modify the status indicator, to a designation of engaging in distracting activity, of at least one of the user devices corresponding to an item of activity deemed as serving as a distraction based on said comparing; and
  transmitting the signal to the at least one user device corresponding to an item of activity deemed as serving as a distraction to the participating users.

\* \* \* \* \*